United States Patent
Seyedi et al.

(10) Patent No.: US 11,817,906 B1
(45) Date of Patent: Nov. 14, 2023

(54) IMPLEMENTING LOW-LOSS VARIABLE OPTICAL DELAY LINES

(71) Applicant: Mellanox Technologies, Ltd., Yokneam (IL)

(72) Inventors: Mir Ashkan Seyedi, Atlanta, GA (US); Liron Gantz, Haifa (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 17/846,151

(22) Filed: Jun. 22, 2022

(51) Int. Cl.
*H04B 10/40* (2013.01)
*H04B 10/079* (2013.01)
*H04B 10/2513* (2013.01)
*H04B 10/27* (2013.01)
*H04B 10/2575* (2013.01)

(52) U.S. Cl.
CPC ....... *H04B 10/40* (2013.01); *H04B 10/07951* (2013.01); *H04B 10/25133* (2013.01); *H04B 10/25759* (2013.01); *H04B 10/271* (2013.01)

(58) Field of Classification Search
None
See application file for complete search history.

(56) References Cited

U.S. PATENT DOCUMENTS

| | | | |
|---|---|---|---|
| 2005/0041922 A1* | 2/2005 | Yao | G02B 6/276 385/11 |
| 2007/0065151 A1* | 3/2007 | Dybsetter | H04B 10/40 398/135 |
| 2017/0288779 A1* | 10/2017 | Tatum | H04B 10/25073 |
| 2019/0103922 A1* | 4/2019 | Akizawa | H04B 10/695 |
| 2019/0113686 A1* | 4/2019 | Matres | H04B 10/07957 |
| 2019/0243164 A1* | 8/2019 | Nelson | H03K 17/687 |

\* cited by examiner

*Primary Examiner* — Darren E Wolf
(74) *Attorney, Agent, or Firm* — Lowenstein Sandler LLP

(57) ABSTRACT

A system can include an optical receiver. The optical receiver can have an optical delay component and at least one electrical component (e.g., diode, resistor and/or transistor) operatively coupled to (e.g., integrated within) the optical delay component. The system can further include a processing device, operatively coupled to a memory, that can tune an amount of optical delay implemented by the optical delay component in a low loss and/or low dispersion manner. For example, the processing device can adjust, based on optical delay tuning data (e.g., built-in self-test (BIST) data), the at least one electrical component to modify at least one property of the at least one optical delay component.

18 Claims, 6 Drawing Sheets

IMPLEMENTING LOW-LOSS VARIABLE OPTICAL DELAY LINES

TECHNICAL FIELD

At least one embodiment pertains to processing resources used to perform and facilitate high-speed communications. For example, at least one embodiment pertains to technology for implementing low-loss variable optical delay lines.

BACKGROUND

Communication systems transmit signals from a transmitter to a receiver via a communication channel or medium (e.g., cables, printed circuit boards, links, wirelessly, etc.) For example, the transmitter can use serial communication to transmit serial data within a serial data stream to the receiver via a serial communication channel (e.g., data sent sequentially on a per-bit basis over a single channel). As another example, the transmitter can use parallel communication to transmit parallel data within a parallel data stream to the receiver via the communication channel (i.e., multiple bits of data sent simultaneously via respective channels). Data can be encoded within a carrier wave or signal using a modulation technique. One example of a modulation technique is frequency modulation, which encodes data within a carrier signal by varying the frequency of the carrier signal. To do so, a modulator can combine the carrier signal with a data signal (i.e., baseband signal) to generate a modulated signal.

BRIEF DESCRIPTION OF DRAWINGS

Various embodiments in accordance with the present disclosure will be described with reference to the drawings, in which.

DETAILED DESCRIPTION

Figure 1:
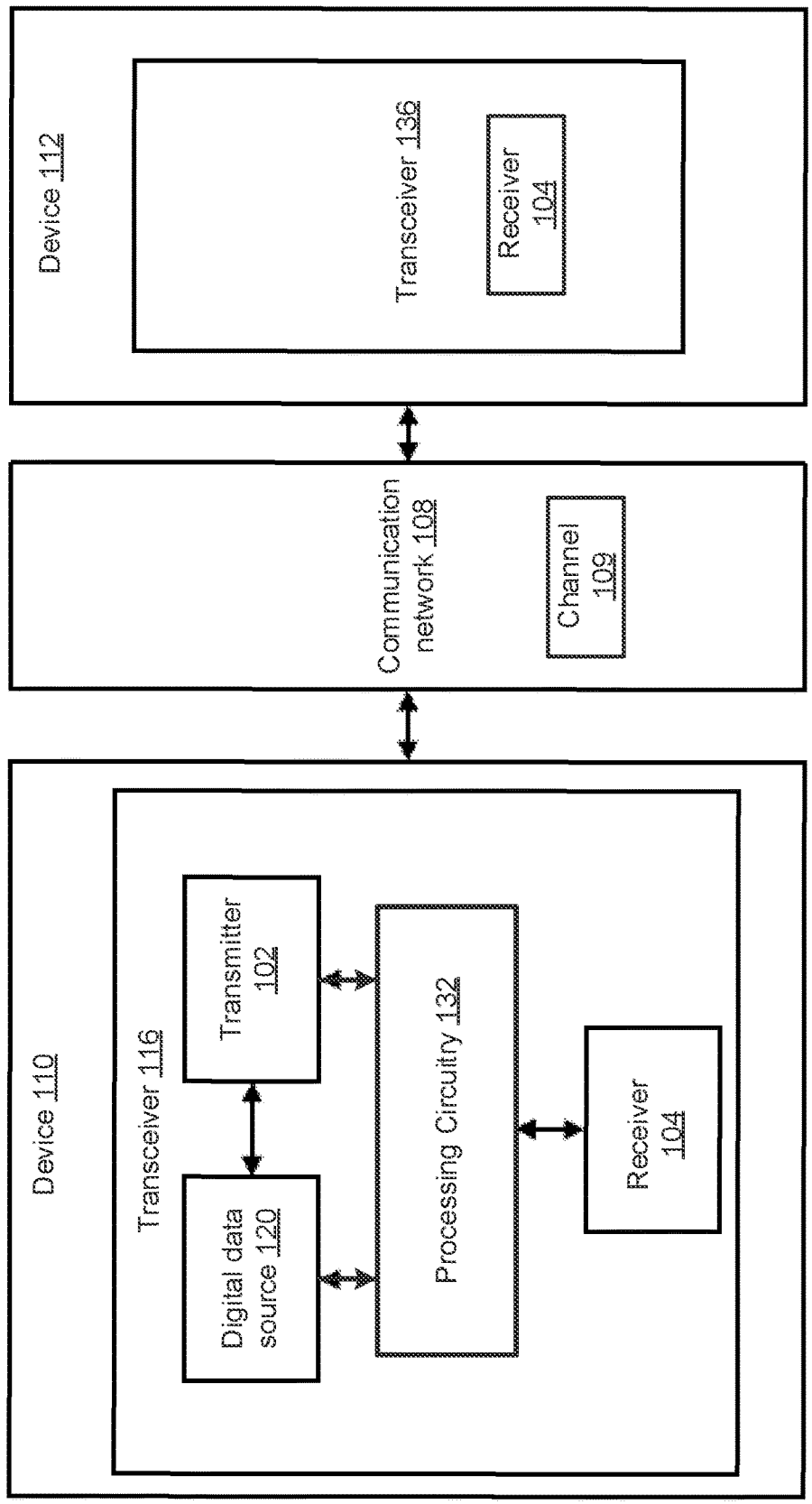
FIG. 1 is an example communication system, in accordance with at least some embodiments.

An optical receiver can receive optical signals from an optical transceiver based on optical signals generated by an optical signal generator. For example, the optical signal generator can include a laser. The optical signals received by the optical receiver can include polarized light each corresponding to a respective polarization, or electromagnetic mode. The optical receiver can receive polarized light via one or more waveguides. For example, an optical receiver can receive polarized light having a first electromagnetic mode via a first waveguide and a second electromagnetic mode different from the first electromagnetic mode via a second waveguide. Each of the electromagnetic modes can reflect polarized light having a respective polarization state. One example of a polarization state is a linear polarization state (e.g., confinement of the electric field of light to a single plane along the direction of propagation). If the optical receiver receives polarized light having a first electromagnetic mode ($EM_1$) and polarized light having a second electromagnetic mode ($EM_2$), then the optical receiver can receive a mixture of polarized light as $\alpha EM_1 \times \beta EM_2$, where $\alpha$, $\beta \in [1,0]$ and $\alpha+\beta=1$. Accordingly, the optical receiver can receive either entirely polarized light having the first electromagnetic mode, entirely polarized light having the second electromagnetic mode, or any suitable mixture of polarized light having the first and second electromagnetic modes.

In some implementations, the first electromagnetic mode can be a transverse-magnetic (TM) mode and the second electromagnetic mode can be a transverse-electric (TE) mode. For example, the TE mode can reflect polarized light having s-polarization (e.g., the electric field is parallel to the plane of incidence of light), and the TM mode can reflect polarized light having p-polarization (e.g., the electric field is perpendicular to the plane of incidence of light).

A relationship exists between the local or effective index of refraction of a waveguide medium (e.g., silicon) and the velocity or speed at which a pulse of light travels through the waveguide, referred to as group velocity. More specifically, group velocity refers to the speed at which a range of frequencies travel to create a time-domain pulse. For example, group velocity can be approximated as $$\frac{c}{n_i},$$

where c refers to the speed of light in a vacuum and $n_i$ refers to an effective index of refraction of the waveguide for guiding an optical signal having to an i-th electromagnetic mode (e.g., TM mode or TE mode).

Illustratively, light received by the optical receiver can be received by (e.g., impinged onto) a photodetector from two separate polarized light inputs. For example, polarized light having the TM mode and polarized light having the TE mode at the same frequency can be combined and injected into a photodetector. Alternatively, polarized light having the TM mode and polarized light having the TE mode may be injected into the photodetector without being combined. As mentioned above, polarized light having different electromagnetic modes can travel through respective waveguides having different indices of refraction. Therefore, polarized light having different electromagnetic modes can arrive at the photodetector at different times, where the difference in time is a function of at least the length of the waveguide and the difference in group velocity between the different electromagnetic modes. Local temperature variations, which result in variations in the indices of refraction and thus group velocity as described above, can also impact the arrival times of polarized light to their respective destinations. These impacted arrival times can result in errors in the received optical signals. For example, these effects can be observed with respect to an optical component (e.g., optical chip) into a device (e.g., switch, GPU and/or CPU), as the optical component can experience local temperature variations as the device heats up or cools down in accordance with its workload. Moreover, polarized light having one electromagnetic mode may see a different temperature and perhaps a path length difference due to fabrication variation as compared to polarized light having another electromagnetic mode, which should generally be compensated for to reduce or eliminate jitter and errors.

To address differences in arrival times of polarized light having different electromagnetic modes, a system can include at least one optical delay component configured to adjust an optical delay of an optical signal. For example, the at least one optical delay component can cause a phase shift of an optical signal to add optical delay to the optical signal. The optical signal received by the at least one optical delay component can include polarized light having an electromagnetic mode. In some embodiments, the at least one optical delay component includes a first optical delay component configured to receive polarized light having a first electromagnetic mode (e.g., TE mode) and a second optical delay component configured to receive polarized light having a second electromagnetic mode (e.g., TM mode). For example, one of the first optical delay component or the second optical delay component can be configured to adjust the optical delay of its respective polarized light signal, while the other of the first optical delay component or the second optical delay component can be fixed to add zero optical delay to its respective polarized light signal. However, typical ways of introducing optical delay can introduce, for example, power loss ("loss") and/or dispersion (e.g., frequency-dependent delay).

Aspects of the present disclosure can address the deficiencies above and other challenges by implementing low-loss variable optical delay lines. Embodiments described herein can enable a faster, more power-efficient, and lower-loss method to vary optical delay compensation for varying group velocities of received optical signals, such as a result of local temperature variations due to thermal envelopes of co-packed chips. For example, embodiments described herein may introduce a uniform time delay for all frequencies included in a time-domain optical pulse, without relying on excess light-absorbing carriers that contribute to optical loss. Feedback obtained from a photodetector can be used to tune the optical delay of at least one optical delay component. Thus, embodiments described herein can be used to tune the at least one optical delay component to adjust the optical delay for at least a portion of an optical signal, which can cause polarized light having different electromagnetic modes (and thus different group velocities) to arrive at a photodetector at approximately the same time.

To implement low-loss variable optical delay lines in embodiments, a system can include an optical receiver having at least one optical delay component. In some embodiments, the at least one optical delay component includes an optical ring resonator, referred to herein as a ring resonator. The at least one optical delay component is configured to receive polarized light having a respective electromagnetic mode (e.g., TE mode or TM mode). The at least one optical delay component can be operatively coupled to at least one electrical component.

The system can further include a controller (i.e., processing device) that can tune (i.e., calibrate) the optical delay imposed by the at least one optical delay component in a low-loss manner. To do so, the controller can receive optical delay tuning data (e.g., built-in self-test data) and adjust, based on the optical delay tuning data, the at least one electrical component (e.g., bias the at least one electrical component) to modify at least one property of the at least one optical delay component (e.g., index of refraction). In some embodiments, to adjust the at least one electrical component, the controller can determine, from the optical delay tuning data, an amount of optical delay to be implemented by the at least one optical delay component, and cause an amount of voltage or current to be applied to the at least one electrical component in accordance with the amount of optical delay. The amount of voltage, for example, that is applied may cause the at least one electrical component to, in accordance with the amount of optical delay, perform at least one of: generate a number of charge carriers, or change a local temperature of the at least one optical delay component. For example, the at least one electrical component can include at least of a diode, a resistor, or a transistor that is variable to adjust a property of an optical delay component.

The relationship between the amount of optical delay and the amount of voltage to be applied to the at least one electrical component can be determined a priori at the foundry fabrication level during device calibration. For example, the controller can determine, from the optical delay tuning data, the amount of voltage to be applied to the at least one electrical component in a number of ways. In some embodiments, the optical delay tuning data includes calibration data (e.g., stored in a look-up stable in local memory). The controller can include a feedback circuit that can analyze a current diagram (e.g., eye diagram) or jitter value (e.g., derived from a BIST block), calculate a desired amount of time delay, determine an amount of voltage to achieve the desired amount of time delay, and set the amount of voltage as the amount of voltage to be applied to the at least one electrical component. In alternative embodiments, the controller can apply different amounts of voltage within a valid range until the jitter value is minimized.

For example, if the at least one optical delay component includes a ring resonator, embodiments described herein can modify the average number of round-trip turns (i.e., the average number of turns that a photon can make before leaving the ring waveguide), or average photon lifetime (i.e., the average time that a photon will spend in the ring waveguide before exiting). To do so, embodiments described herein can adjust a full width at half maximum (FWHM) value of the transmission spectra observed to exit the at least one optical delay component. Generally, FWHM is the difference between the two values of an independent variable (e.g., value along the x-axis) at which a dependent variable (e.g., value along the y-axis) is determined to be equal to half of its maximum value. For example, the FWHM value can be inversely proportions to a quality factor Q of the ring waveguide (e.g., $Q=\lambda_0/\text{FWHM}$, where $\lambda_0$ is the resonant wavelength for the ring waveguide). The quality factor Q is a dimensionless quantity that serves as a metric of "sharpness" of resonance or filtering achieved by the ring waveguide. The quality factor Q can be directly (e.g., linearly) related to the average number of round-trip turns and/or average photon lifetime. Therefore, embodiments described herein can adjust optical delay by modifying the FWHM value and/or quality factor Q in a low loss and/or low dispersion manner, which modifies the average number of round-trip turns and/or average photon lifetime. Further details regarding implementing low-loss variable optical delay lines will be described below with reference to FIGS. 1-6.

Advantages of the present disclosure include, for example, uniform group velocity impact, reduced power consumption, fast compensation, and reduced optical loss as compared to traditional techniques for introducing delay in an optical signal. For example, embodiments described herein can avoid having to use optical delay compensation circuitry. For example, optical delay compensation circuitry may not uniformly impact the group velocity. Moreover, optical delay compensation circuitry can consume non-negligible amounts of electrical power. Optical delay compensation circuits can have an inherently slow tuning time of these circuits (e.g., on the order of microseconds), which can make it difficult to quickly compensate for temperature variations. Also, optical delay compensation circuitry can introduce non-negligible optical loss, which can further degrade the received optical signal and thus lead to more errors at the receiver. The optical signal delay techniques described in embodiments herein achieve optical signal delay with negligible optical loss, with fast tuning times, and with minimal power consumption.

FIG. 1 illustrates an example communication system 100 according to at least one example embodiment. The system 100 includes a device 110, a communication network 108 including a communication channel 109, and a device 112. In at least one embodiment, devices 110 and 112 are two end-point devices in a computing system, such as a central processing unit (CPU) or graphics processing unit (GPU). In at least one embodiment, devices 110 and 112 are two servers. In at least one example embodiment, devices 110 and 112 correspond to one or more of a Personal Computer (PC), a laptop, a tablet, a smartphone, a server, a collection of servers, or the like. In some embodiments, the devices 110 and 112 may correspond to any appropriate type of device that communicates with other devices connected to a common type of communication network 108. According to embodiments, the receiver 104 of devices 110 or 112 may correspond to a GPU, a switch (e.g., a high-speed network switch), a network adapter, a CPU, a memory device, an input/output (I/O) device, other peripheral devices or components on a system-on-chip (SoC), or other devices and components at which a signal is received or measured, etc. As another specific but non-limiting example, the devices 110 and 112 may correspond to servers offering information resources, services, and/or applications to user devices, client devices, or other hosts in the system 100. In one example, devices 110 and 112 may correspond to network devices such as switches, network adapters, or data processing units (DPUs).

Examples of the communication network 108 that may be used to connect the devices 110 and 112 include an Internet Protocol (IP) network, an Ethernet network, an InfiniBand (IB) network, a Fibre Channel network, the Internet, a cellular communication network, a wireless communication network, a ground referenced signaling (GRS) link, combinations thereof (e.g., Fibre Channel over Ethernet), variants thereof, and/or the like. In one specific but non-limiting example, the communication network 108 is a network that enables data transmission between the devices 110 and 112 using data signals (e.g., digital, optical, wireless signals).

The device 110 includes a transceiver 116 for sending and receiving signals, for example, data signals. The data signals may be digital or optical signals modulated with data or other suitable signals for carrying data.

The transceiver 116 may include a digital data source 120, a transmitter 102, a receiver 104, and processing circuitry 132 that controls the transceiver 116. The digital data source 120 may include suitable hardware and/or software for outputting data in a digital format (e.g., in binary code and/or thermometer code). The digital data output by the digital data source 120 may be retrieved from memory (not illustrated) or generated according to input (e.g., user input).

The transmitter 124 includes suitable software and/or hardware for receiving digital data from the digital data source 120 and outputting data signals according to the digital data for transmission over the communication network 108 to a receiver 104 of device 112. Additional details of the structure of the transmitter 124 are discussed in more detail below with reference to the figures.

The receiver 104 of device 110 and 112 may include suitable hardware and/or software for receiving signals, such as data signals from the communication network 108. For example, the receiver 104 may include components for receiving optical signals.

The processing circuitry 132 may comprise software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132 may comprise hardware, such as an application-specific integrated circuit (ASIC). Other non-limiting examples of the processing circuitry 132 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control the overall operation of the transceiver 116.

In some examples, the processing circuitry 132 can facilitate a method to implement low-loss variable optical delay lines. For example, the processing circuitry 132 can receive optical delay tuning data and adjust, based on the optical delay tuning data, at least one electrical component to modify at least one property of at least one optical delay component, as described with reference to FIGS. 2-5.

The transceiver 116 or selected elements of the transceiver 116 may take the form of a pluggable card or controller for the device 110. For example, the transceiver 116 or selected elements of the transceiver 116 may be implemented on a network interface card (NIC).

The device 112 may include a transceiver 136 for sending and receiving signals, for example, data signals over a channel 109 of the communication network 108. The same or similar structure of the transceiver 116 may be applied to transceiver 136, and thus, the structure of transceiver 136 is not described separately.

Although not explicitly shown, it should be appreciated that devices 110 and 112 and the transceivers 116 and 120 may include other processing devices, storage devices, and/or or communication interfaces generally associated with computing tasks, such as sending and receiving data.

Figure 2:
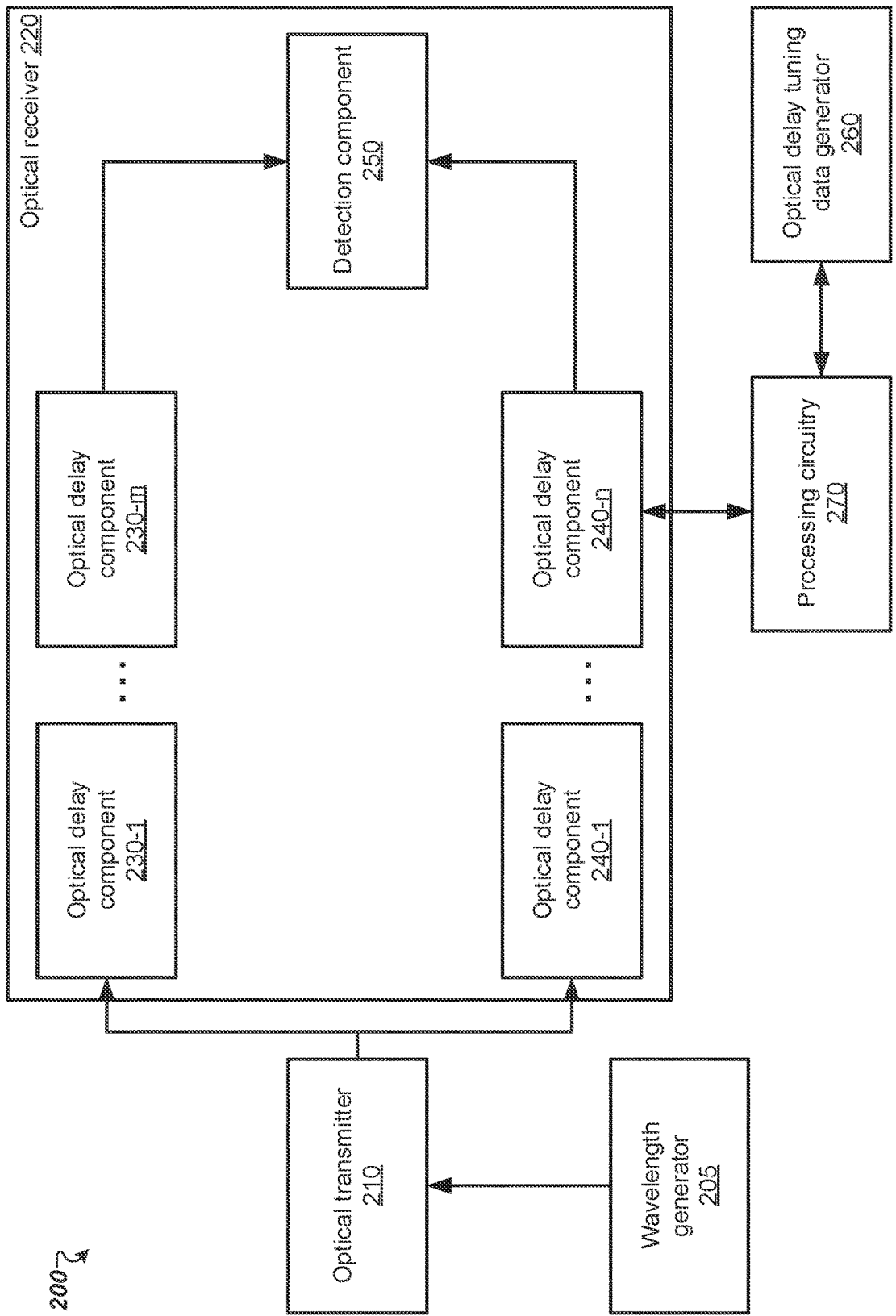
FIG. 2 illustrates an example system for implementing low-loss variable optical delay lines, in accordance with at least some embodiments.

FIG. 2 illustrates an example system 200 for implementing low-loss variable optical delay lines, in accordance with at least some embodiments. As shown, the system 200 includes a wavelength generator 205. The wavelength generator 205 is configured to generate a number of wavelengths of radiation. In some embodiments, the wavelength generator 210 includes a laser. The system 200 can further include an optical transmitter ("transmitter") configured to receive the wavelengths of radiation from the wavelength generator 210. The system 200 can further include an optical receiver 220 configured to receive transmitted wavelengths from the transmitter 210.

The optical receiver 220 can include a first set of optical delay components 230-1 through 230-m and a second set of optical delay components 240-1 through 240-n. In some embodiments, m=n. In some embodiments, the first set of optical delay components 230-1 through 230-m includes at least one optical delay component for receiving polarized light having a first electromagnetic mode, and the second set of optical delay components 240-1 through 240-n includes at least one optical component for receiving polarized light having a second electromagnetic mode different from the first electromagnetic mode. For example, the first electromagnetic mode can be a transverse electric (TE) mode and the second electromagnetic mode can be a transverse magnetic (TM) mode.

The optical receiver 220 can further include a detection component 250. The detection component 250 can include an optical multiplexer (not shown) configured to recombine the optical signals from the first set of optical delay components 230-1 through 230-m and the second set of optical delay components 240-1 through 240-N. The detection component 250 can include a set of photodetectors (not shown). Each photodetector of the set of photodetectors can receive a respective wavelength of light (e.g., wavelength of light output by the optical multiplexer).

In some embodiments, the at least one optical delay component includes an optical ring resonator ("ring resonator"). A ring resonator can include set of waveguides in which at least one waveguide is in the form of a closed loop ("ring waveguide") disposed between a pair of bus waveguides (e.g., an input waveguide and an output waveguide). The ring waveguide can be tuned to a resonant wavelength. For example, photons having the resonant wavelength can be coupled to the ring waveguide. Thus, when an optical signal having the resonant wavelength is received from the input waveguide, the ring waveguide can cause the intensity of the optical signal to increase over a number of round trips due to constructive interference. Since only a portion of the wavelengths of the optical signal will be at resonance within the ring waveguide, the ring resonator can function as an optical filter. Ring resonators exploit phenomena such as total internal reflection and optical coupling, which can depend on the index of refraction of the material of the ring resonator (e.g., silicon). Further details regarding ring resonators are described below with reference to FIG. 3.

The system 200 can further include an optical delay tuning data generator 260 and processing circuitry (i.e., processing device) 270. For example, the processing circuitry 270 can include a controller. Although the processing circuitry 270 is shown as a separate component from the receiver 220 and the optical delay tuning data generator 260 in FIG. 2, in some embodiments, the processing circuitry 270 is included within the receiver 220 and/or the optical delay tuning data generator 260.

The optical delay tuning data generator 260 is configured to receive data (e.g., analog data) from the optical receiver 200, and generate optical delay tuning data (e.g., digital data) that can be used by the processing circuitry 270 to tune optical delay in a low-loss and low-dispersion manner. For example, the optical delay tuning data generator 260 can generate built-in self-test (BIST) data that can be used as feedback for adjusting the at least one electrical component.

More specifically the processing circuitry 270 can adjust at least one electrical component, operatively coupled to the at least one optical delay component, to modify at least one property of the at least one optical delay component (e.g., at least one of the optical delay components of the first set or the second set). In some embodiments, the at least one property can include an index of refraction of a waveguide material of the ring waveguide. For example, the waveguide material can include silicon (Si). Adjusting the at least one electrical component to modify the at least one property of the at least one optical delay component can include determining, from the optical delay tuning data, an amount of optical delay to be implemented by the at least one optical delay component, and causing an amount of voltage, current, power, etc. to be applied to the at least one electrical component in accordance with the amount of optical delay. In some embodiments, the amount of voltage, current, power, etc. causes the at least one electrical component to, in accordance with the amount of optical delay, perform at least one of: generate a number of charge carriers, or change a local temperature of the at least one optical delay component. For example, the at least one electrical component can include at least one of: a diode, a resistor, or a transistor. The diode can be a P-N diode, a P-I-N diode, etc. The transistor can be a field-effect transistor (FET) or other type of transistor. Further details regarding the at least one optical delay component will be described below with reference to FIG. 3.

The relationship between the amount of optical delay and the amount of voltage to be applied to the at least one electrical component can be determined a priori at the foundry fabrication level during device calibration. For example, the processing circuitry 270 can determine, from the optical delay tuning data, the amount of voltage to be applied to the at least one electrical component in a number of ways. In some embodiments, the optical delay tuning data includes calibration data (e.g., stored in a look-up stable in local memory). The processing circuitry 270 can include a feedback circuit that can analyze a current diagram (e.g., eye diagram) or jitter value (e.g., derived from a BIST block), calculate a desired amount of time delay, determine an amount of voltage to achieve the desired amount of time delay, and set the amount of voltage as the amount of voltage to be applied to the at least one electrical component. In alternative embodiments, the processing circuitry 270 can apply different amounts of voltage within a valid range until the jitter value is minimized.

Figure 3:
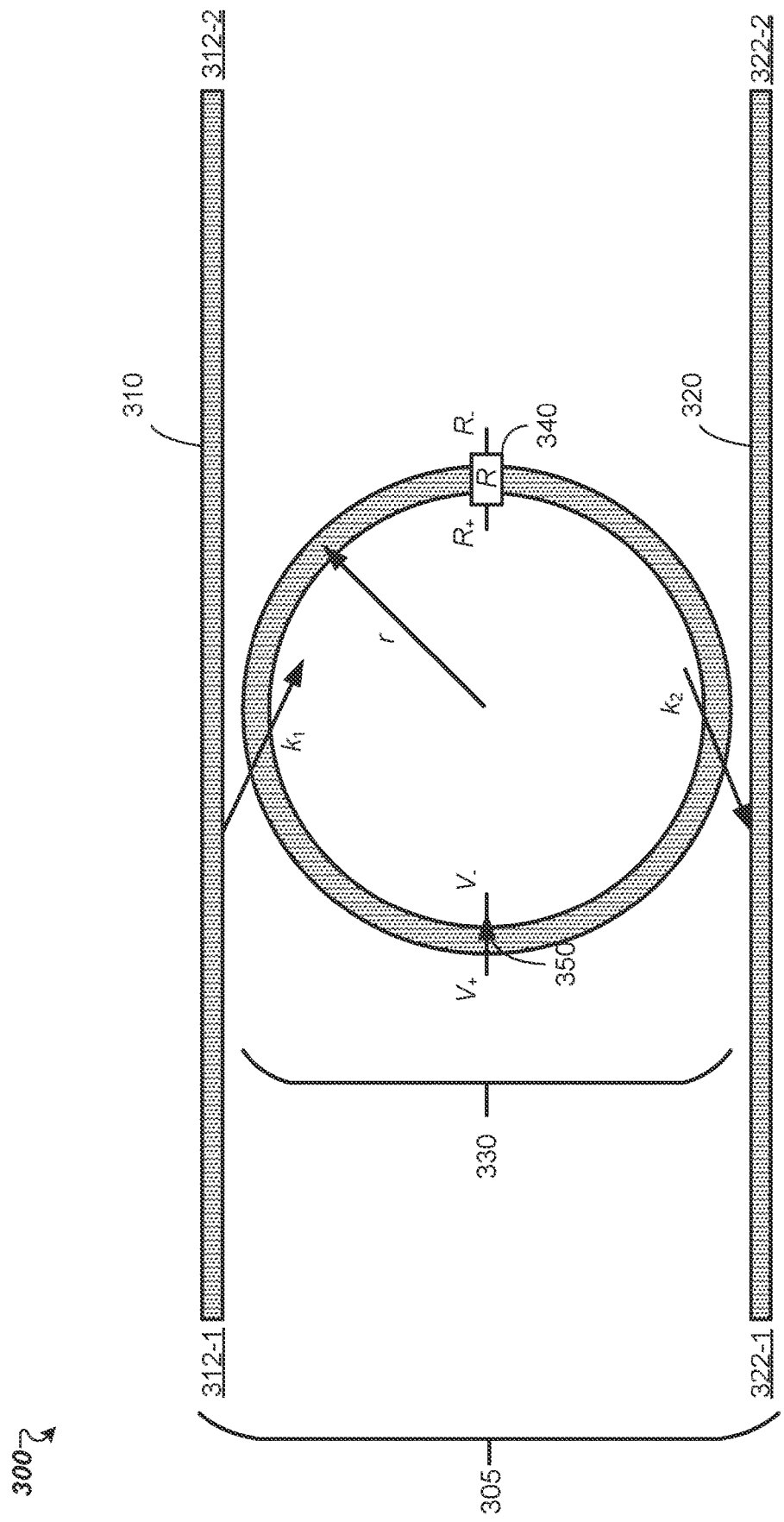
FIG. 3 illustrates an example optical delay component, in accordance with at least some embodiments.

FIG. 3 illustrates an example optical delay component 300, according to at least one example embodiment. The optical delay component 300 can be implemented in at least one of the optical delay components 230-1 through 230-m or 240-1 through 240-n, as described above with reference to FIG. 2. In this illustrative example, the optical delay component 300 includes a ring resonator 305. The ring resonator 305 includes a pair of bus waveguides 310 and 320. For example, the bus waveguide 310 can be a through bus waveguide and the bus waveguide 320 can be a drop bus waveguide. In some embodiments, and as shown in this illustrative example, the bus waveguides 310 and 320 are linear (e.g., horizontal) waveguides. However, the bus waveguides 310 and 320 can have any suitable shape in accordance with embodiments described herein.

The bus waveguides 310 and 320 can have respective ports, which can be used to address and probe the behavior of the ring resonator 305. As shown in this illustrative example, the bus waveguide 210 can have ports 312-1 and 312-2, and the bus waveguide 320 can have ports 322-1 and 322-2. For example, port 312-1 can be referred to as an input port, port 312-2 can be referred to as a through port, port 322-1 can be referred to as a drop port and port 322-2 can be referred to as an add port. Accordingly, in this illustrative example, the ring resonator 305 can be a four-port ring resonator.

The ring resonator 305 further includes a ring waveguide 330 disposed between the bus waveguides 310 and 320. The ring waveguide 330 is a closed-loop structure. The arrow "r" denotes the radius of the ring waveguide 330, as measured as the distance from the center of the ring to the center of the ring waveguide 330. The radius of the ring waveguide 330 can be on the order of micrometers or microns (μm) in some embodiments. In some embodiments, the radius of the ring waveguide 330 is between about 1 μm to about 10 μm.

The optical delay component 300 (e.g., the ring resonator 305) is configured to receive at least one wavelength of radiation generated by a wavelength generator (e.g., the wavelength generator 210 of FIG. 2). In some embodiments, the at least one wavelength of radiation includes multiple wavelengths of radiation. For example, a tunable optical wave (e.g., laser light) having a number of wavelengths of radiation can be received in the port 312-1. The ring waveguide 330 can be tuned to a resonant wavelength ($\lambda_0$) such that photons having the resonant wavelength are coupled to the ring waveguide 330 and re-routed to the port 322-1, while photons not having the resonant wavelength pass through toward the port 312-2. Accordingly, the ring waveguide 330 can function as a spectral filter.

Illustratively, assume that a first photon having the resonant wavelength is received by the port 312-1. As this photon travels left to right, the first photon enters the ring waveguide 330 via optical coupling. If a second photon having the resonant wavelength is received by the port 312-1, the subsequent photon adds coherently (in phase and polarization and frequency) with the first photon that is already in the ring waveguide 230. This initiates a process referred to as field enhancement, in which photons having the resonant wavelength continue to build up within the ring waveguide 330. Arrow "$k_1$" denotes a first coupling coefficient corresponding to an amount of optical power coupled to the ring waveguide 330 from the bus waveguide 310 (e.g., percentage).

The waveguides 310-330 can be formed from any suitable material that has properties (e.g., index of refraction) to enable the optical coupling of light having the resonant wavelength within the ring waveguide 330. In some embodiments, the waveguides 310-330 are formed from a semiconductor material. For example, the waveguides 310-330 can be formed from silicon (Si). Alternatively, at least one of the waveguides 310-330 can be formed from a different material.

The field enhancement process described above cannot occur indefinitely. At a certain electrical field or optical power level, the number of photons having the resonant wavelength within the ring waveguide 330 can reach a saturation threshold and begin to radiate or couple out of the ring waveguide 330. Arrow "$k_2$" denotes a second coupling coefficient corresponding to an amount of optical power coupled from the ring waveguide 330 to the bus waveguide 320 (e.g., percentage).

The optical power level can be correlated with a quality factor of the ring resonator 305, Q. The quality factor Q is a dimensionless quantity that serves as a metric of "sharpness" of resonance or filtering achieved by the ring waveguide 330. The quality factor Q can be used to determine the average number of round-trip turns or cycles that a photon can make before leaving the ring waveguide 330 and entering the bus waveguide 320. For example, the quality factor Q can be directly (e.g., linearly) related to average photon lifetime, which is the average time that a photo will spend in the ring waveguide 330 before exiting. Accordingly, the higher the quality factor Q, the greater the average photon lifetime and number of round-trip turns.

The quality factor Q can be inversely proportional to a full width at half maximum (FWHM) value of the transmission spectra observed to exit through the port 312-2. For example, $Q=\lambda_0/FWHM$. Here, the FWHM is the difference or distance between two wavelength values, observed at the port 312-2, having an optical power level determined to be equal to half of a maximum optical power value. For example, as will be described in further detail below with reference to FIG. 4, the optical power level can be modeled as a transfer function (e.g., Lorentzian). Accordingly, a greater FWHM value translates into a lower Q value.

The Q value and/or FWHM value can be used to derive the optical delay implemented by the optical delay component. For example, the optical delay can be determined from the average photon lifetime, which can be determined from the Q value and/or the FWHM value. Illustratively, assume that $Q=\lambda_0/FWHM=10,000$. The FWHM value can be defined by a first wavelength $\lambda_1$ having a value less than the value of the resonant wavelength and a second wavelength $\lambda_2$ having a value greater than the value of the resonant wavelength. The first and second wavelengths can be converted into respective frequencies $f_1$ and $f_2$, and the difference between $f_1$ and $f_2$ ($\Delta f$) can be about 20 gigahertz (GHz). The average photon lifetime τ has a magnitude of approximately $1/\Delta f$ nanoseconds (ns), which in this example is about 0.05 ns or 50 picoseconds (ps). If the ring waveguide 330 is in an overcoupled state in which more light is injected into the ring waveguide 330, this means that the on-resonance photon couples into the ring resonator 330, spins around, and leaves via the port 312-2 and is nearly unaffected in loss. In this condition, the on-resonance photon still will spend 50 ps in the ring waveguide 330 and will see no attenuation. Therefore, the ring resonator device 200 can (in this illustrative example) introduce an optical delay of 50 ps for a particular photon of the resonant wavelength.

At least one electrical component can be operatively coupled (e.g., integrated into) the ring waveguide 330 to modify at least one property of the ring waveguide 330. For example, applying a voltage (e.g., bias) to the at least one electrical component can cause a modification to at least the index of refraction of the ring waveguide 330, which can tune the quality factor Q and thus tune the amount of optical delay implemented by the ring resonator 305. The at least one electrical component can include any suitable electronic component(s) in accordance with embodiments described herein. In some embodiments, the at least one electrical component can include at least one of a diode, a resistor, or a transistor (e.g., field-effect transistor (FET)). Accordingly, the at least one electrical component can enable a variable optical delay.

As shown, the at least one electrical component can include a diode 340. In some embodiments, the diode 340 is a P-N diode including a P-N junction between P-type semiconductor material and N-type semiconductor material. In some embodiments, the diode 340 is a P-I-N diode, in which intrinsic semiconductor material (I) is disposed between P-type and N-type semiconductor material.

In some embodiments, the diode 340 can function as a delay adder. For example, when the diode 240 is in an off state (i.e., turned off), the ring resonator 305 can have an initial quality factor Q ($Q_0$), an initial FWHM ($FWHM_0$) and an initial average photon lifetime τ ($\tau_0$). When processing circuitry causes an amount of positive voltage to be applied to the diode 340, the diode 340 can generate a corresponding number of charge carriers for injection into the ring waveguide 330. These charge carriers can modify the index of refraction of the ring waveguide 330 in a manner that increases the FWHM from the $FHWM_0$ to a new FHWM ($FHWM_1$). For example, a relationship can exist between charge carrier density and the index of refraction. The effect can be diminished as the positive voltage exceeds the threshold voltage for the diode. Since FHWM is inversely proportional to the quality factor Q, the $FHWM_1$ corresponds to a new quality factor Q ($Q_1$) that is less than $Q_0$. The decrease in the quality factor from $Q_0$ to $Q_1$ corresponds to a decrease in the average photon lifetime τ from $\tau_0$ to a new average photon lifetime τ ($\tau_1$). In this manner, the diode 340 behaves as a delay modification tool.

Additionally or alternatively, in some embodiments, the diode 340 can function as a delay remover. For example, if the diode 340 is a P-N diode, then an amount of negative voltage applied to the diode 340 can expand the depletion region between the P-type semiconductor material and the N-type semiconductor material. This can cause removal of charge carriers from ring waveguide 330.

Additionally or alternatively, the at least one electrical component can include a resistor (e.g., resistive heater) 350. For example, when processing circuitry causes an amount of voltage to be applied to the resistor 350, the resistor 350 can tune the local temperature which tunes the on-resonance wavelength for the ring waveguide 330.

The diode 340 and the resistor 350 can adjust optical delay with different amounts of granularity. For example, the diode 340 can be a fine-delay component and the resistor 350 can be a coarse-delay component. Moreover, the optical delay component can include multiple diodes, resistors, transistors, etc. that have respective sensitivities. Accordingly, the at least one electrical component can include multiple electrical components to more accurately tune the at least one optical delay component for achieving a particular optical delay in some embodiments.

Illustratively, assume a data rate of 200 gigabit per second (Gbps). The unit interval defining the time width of a bit that is sent can be about 8 ps. An optical delay component described herein can implement single digit picosecond optical delay (i.e., single digit picosecond resolution), with low loss and/or low dispersion. The amount of optical delay that can be implemented by an optical delay component can be a function of the at least one electrical component operatively coupled to the optical delay component (e.g., diode, resistor and/or a transistor), including turn-on voltage of the at least one electrical component, the number of carriers that can be injected by the at least one electrical component, the temperature changes that can be caused by the at least one electrical component, etc.

Figure 4:
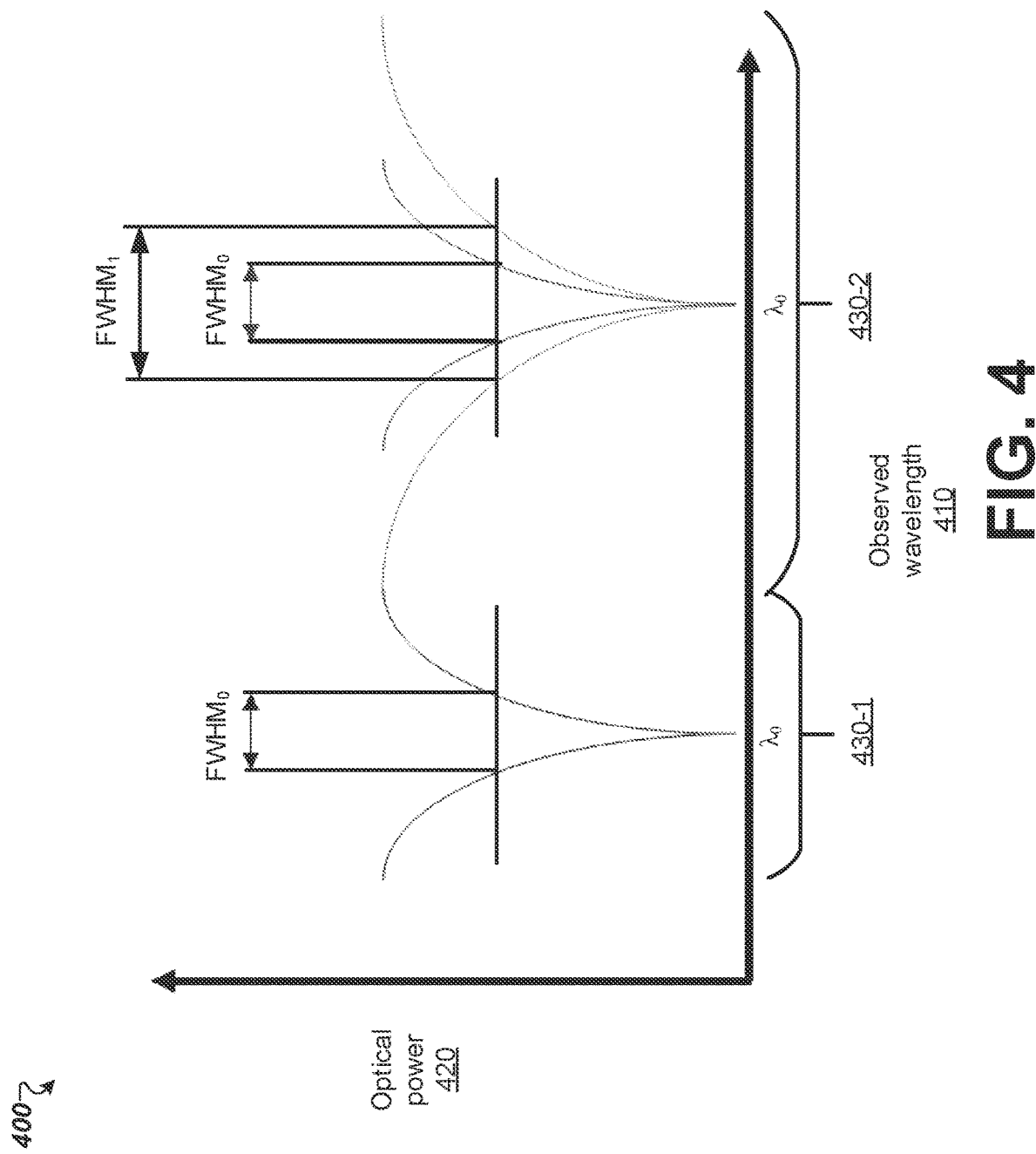
FIG. 4 is an example diagram illustrating an implementation of low-loss variable optical delay, in accordance with at least some embodiments.

FIG. 4 illustrates an example diagram 400 illustrating an implementation of a low-loss variable optical delay line, according to at least one example embodiment. The diagram 400 illustrates the observed optical behavior of an optical delay component, such as the optical delay component 300 of FIG. 3. In this example, the optical delay component includes a ring resonator (e.g., the ring resonator 305 of FIG. 3). For example, a number of wavelengths of radiation (e.g., laser light) can be received by an input port of a bus waveguide of the ring resonator (e.g., port 212-1 of FIG. 2), and the optical behavior can be observed at a through port of a bus waveguide of the ring resonator (e.g., port 312-1 of FIG. 3). For a resonant wavelength "$\lambda_0$" the light is optically coupled to a ring waveguide (e.g., the ring waveguide 330 of FIG. 3). The diagram 400 includes an x-axis 410 corresponding to an observed wavelength, and a y-axis 420 corresponding to output power with respect to each observed wavelength.

The diagram 400 includes a plot 430-1, which illustrates the output power for each observed wavelength in a first state of the optical delay component. The curved lines shown in plot 430-1 approximate the shape of a transfer function, which can be, or can be substantially similar to, a Lorentzian shape. For example, the plot 430-1 can have a first FWHM value ("$FWHM_0$") corresponding to a first quality factor value $Q_0$.

For illustrative purposes, assume that $Q_0=\lambda_0/FWHM_0=10,000$, which corresponds to an average photon lifetime of 50 ps. If the ring waveguide is in an overcoupled state, then the 'dip' of the shape of the curved lines can be about 5-7% below the full 100% level. In this condition, an on-resonance photon can spend 50 ps in the ring waveguide with substantially small (e.g., zero) attenuation or loss. Therefore, the ring resonator device can, in this illustrative example, introduce an optical delay of 50 ps for a particular photon of the correct wavelength.

As described above with reference to FIG. 3, at least one electric component can be operatively coupled to the ring waveguide to tune the optical delay (e.g., at least one of a diode, resistor or transistor). For example, the at least one electric component can be used to generate a number of charge carriers modifying at least one property of the ring waveguide (e.g., index of refraction) to tune the optical delay.

The diagram 400 further includes a plot 430-2, which illustrates the output power for each observed wavelength in a second state of the optical delay component after modifying the at least one property of the ring waveguide. Similar to the plot 430-1, the curved lines shown in plot 430-2 approximate the shape of a transfer function, which can be, or can be substantially similar to, a Lorentzian shape. However, the plot 430-2 has a second FWHM value ("$FWHM_1$") greater than the first FWHM value. Since the second FWHM value is greater than the first FWHM value, the second FWHM value can correspond to a second quality factor value less than the first quality factor value. The decrease in the quality factor value and increase in the FWHM value can correspond to a decrease in average photon lifetime and change in the optical delay. Further details regarding FIG. 4 are described above with reference to FIGS. 1-3.

Figure 5:
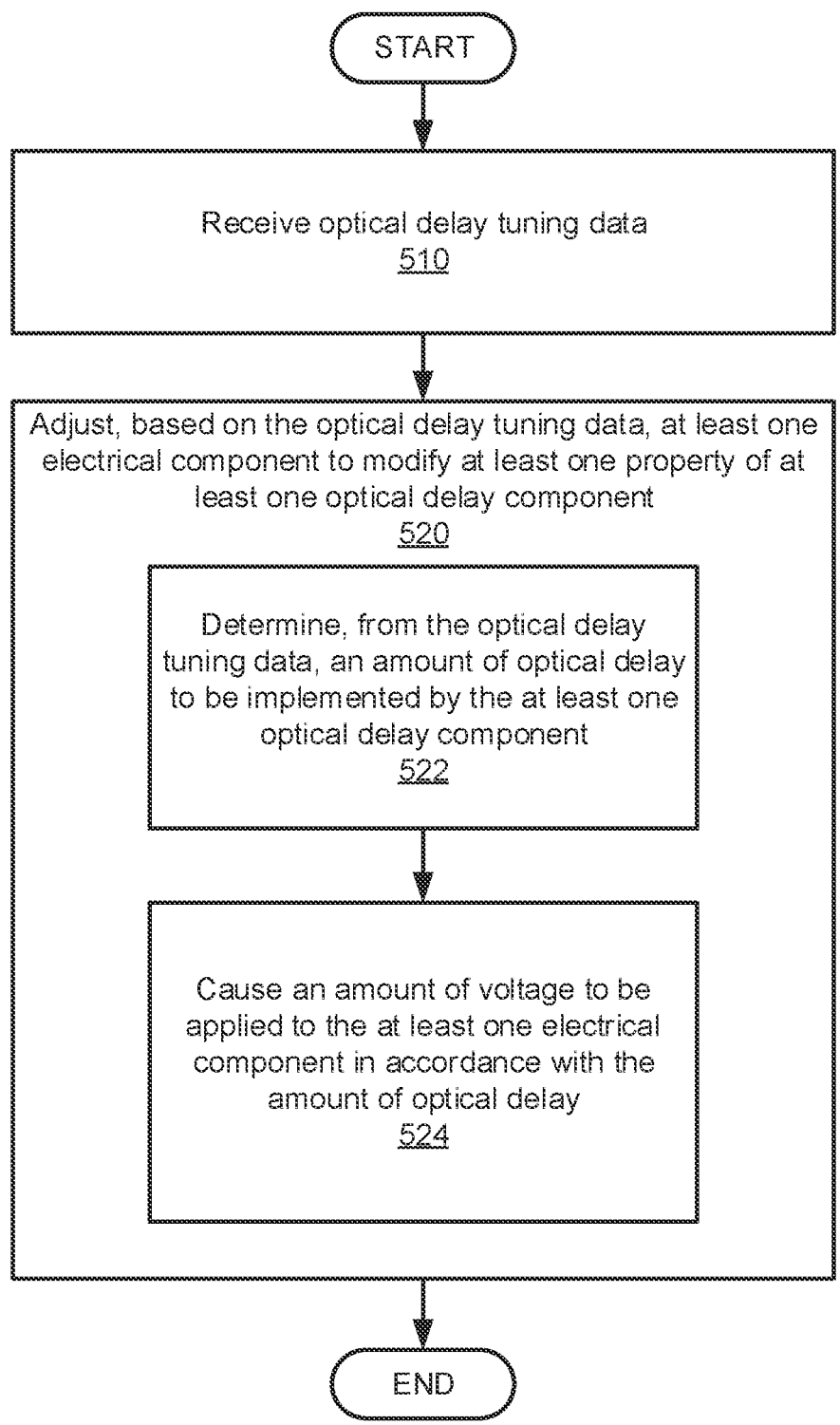
FIG. 5 is a flow diagram of a method to implement a low-loss variable optical delay lines, in accordance with at least some embodiments.

FIG. 5 illustrates a flow diagram of a method 500 to implement low-loss variable optical delay lines, according to at least one example embodiment. The method 500 can be performed by processing logic comprising hardware, software, firmware, or any combination thereof. In at least one embodiment, the method 500 is performed by processing circuitry, such as processing circuitry 132 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, processing logic can receive optical delay tuning data. In some embodiments, the optical delay tuning data includes built-in self-test (BIST) data.

At operation 520, processing logic can adjust, based on the optical delay tuning data, at least one electrical component to modify at least one property of at least one optical delay component. More specifically, the at least one electrical component can be operatively coupled to the at least one optical delay component. The optical delay component can be included within an optical receiver. The optical receiver can receive a set of wavelengths of radiation. For example, the optical receiver can receive a number of photons, where each photon has an associated wavelength. For example, the set of wavelengths can be a set of transmitted wavelengths receive from an optical transceiver operatively coupled to the optical receiver. The set of wavelengths can be generated by a wavelength generator (e.g., laser). The at least one optical delay component can delay at least one wavelength of radiation of the set of wavelengths of radiation. In some embodiments, the at least one optical delay component can include at least one of: a first optical delay component for receiving polarized light having a first electromagnetic mode, or a second optical delay component for receiving polarized light having a second electromagnetic mode different from the first electromagnetic mode. For example, the first electromagnetic mode can be a transverse electric (TE) mode and the second electromagnetic mode can be a transverse magnetic (TM) mode.

In some embodiments, the at least one optical delay component includes an optical ring resonator ("ring resonator"). The ring resonator can include a ring waveguide tuned to a resonant wavelength. In some embodiments, the at least one property can include an index refraction of a waveguide material of the ring waveguide. For example, the ring resonator can include a ring waveguide disposed between a pair of bus waveguides. A first bus waveguide is configured to receive photons. Photons having the resonant wavelength can enter the ring waveguide from the first bus waveguide via optical coupling. Photons can leave the ring waveguide to a second bus waveguide via optical coupling. Modifying the at least one property of the at least one optical delay component can modify an average photon lifetime within the ring waveguide, which in turn can modify an optical delay implemented by the ring resonator.

In some embodiments, adjusting the at least one electrical component to modify the at least one property of the at least one optical delay component can include, at operation 522, determining, from the optical delay tuning data, an amount of optical delay to be implemented by the at least one optical delay component and, at operation 524, causing an amount of voltage to be applied to the at least one electrical component in accordance with the amount of optical delay In some embodiments, the amount of voltage causes the at least one electrical component to, in accordance with the amount of optical delay, perform at least one of: generate a number of charge carriers, or change a local temperature of the at least one optical delay component. For example, the at least one electrical component can include at least one of: a diode, a resistor, or a transistor. The diode can be a P-N diode, a P-I-N diode, etc. The transistor can be a field-effect transistor (FET).

The relationship between the amount of optical delay and the amount of voltage to be applied to the at least one electrical component can be determined a priori at the foundry fabrication level during device calibration. For example, processing logic can determine, from the optical delay tuning data, the amount of voltage to be applied to the at least one electrical component in a number of ways. In some embodiments, the optical delay tuning data includes calibration data (e.g., stored in a look-up stable in local memory). A feedback circuit can analyze a current diagram (e.g., eye diagram) or jitter value (e.g., derived from a BIST block), calculate a desired amount of time delay, determine an amount of voltage to achieve the desired amount of time delay, and set the amount of voltage as the amount of voltage to be applied to the at least one electrical component. In alternative embodiments, processing logic can apply different amounts of voltage within a valid range until the jitter value is minimized. Further details regarding operations 510-530 are described above with reference to FIGS. 2-4.

Figure 6:
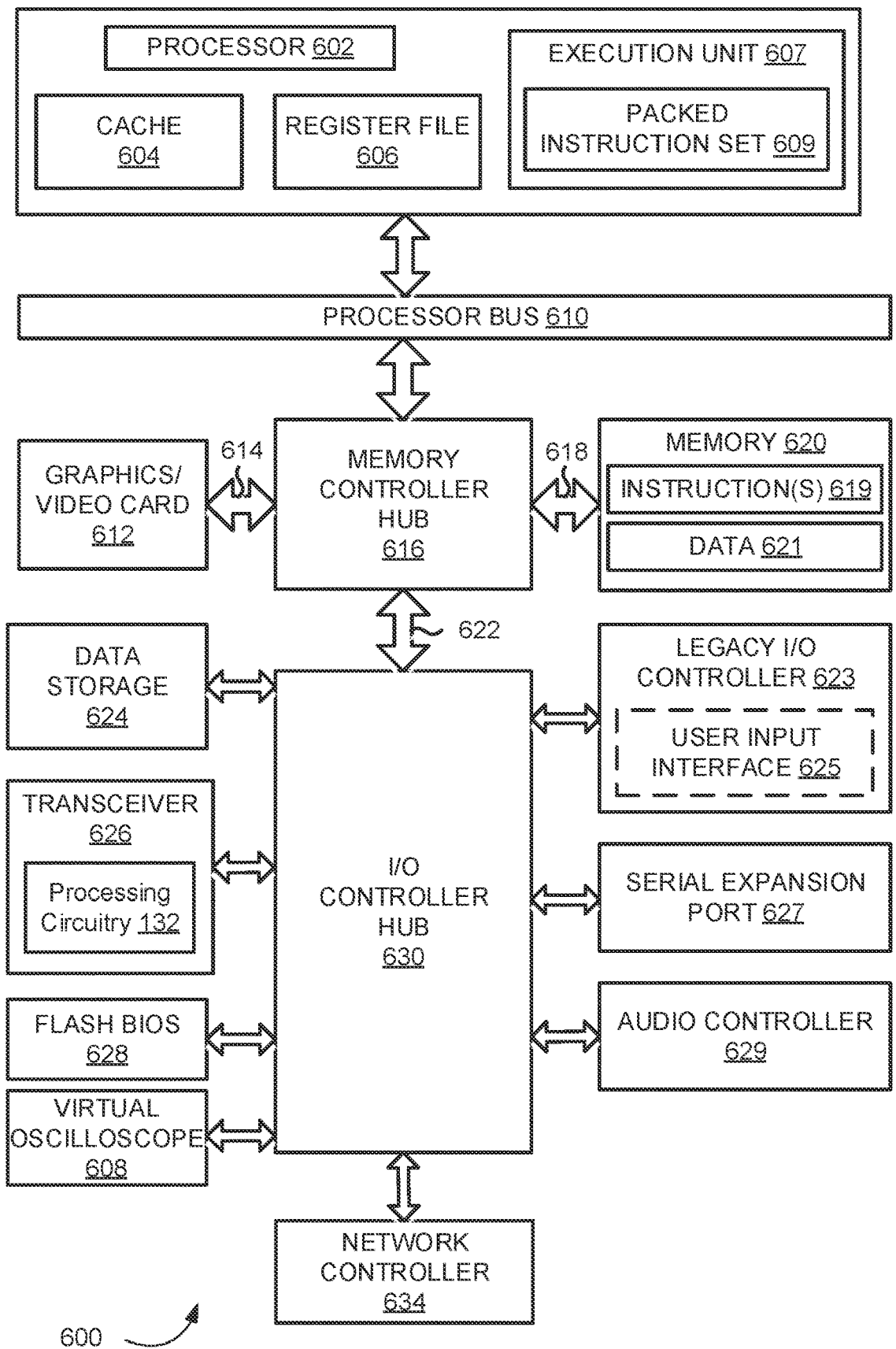
FIG. 6 illustrates an example computer system including a transceiver including a chip-to-chip interconnect, in accordance with at least some embodiments.

FIG. 6 illustrates a computer system 600 including a transceiver including a chip-to-chip interconnect, in accordance with at least one embodiment. In at least one embodiment, computer system 600 may be a system with interconnected devices and components, an SOC, or some combination. In at least one embodiment, computer system 600 is formed with a processor 602 that may include execution units to execute an instruction. In at least one embodiment, computer system 600 may include, without limitation, a component, such as processor 602 to employ execution units including logic to perform algorithms for processing data. In at least one embodiment, computer system 600 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 600 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 600 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 600 may be used in devices such as graphics processing units (GPUs), network adapters, central processing units and network devices such as switch (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 600 may include, without limitation, processor 602 that may include, without limitation, one or more execution units 607 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 600 is a single processor desktop or server system. In at least one embodiment, computer system 600 may be a multiprocessor system. In at least one embodiment, processor 602 may include, without limitation, a CISC microprocessor, a RISC microprocessor, a VLIW microprocessor, a processor implementing a combination of instruction sets, or any other processor device, such as a digital signal processor, for example. In at least one embodiment, processor 602 may be coupled to a processor bus 610 that may transmit data signals between processor 602 and other components in computer system 600.

In at least one embodiment, processor 602 may include, without limitation, a Level 1 ("L1") internal cache memory ("cache") 604. In at least one embodiment, processor 602 may have a single internal cache or multiple levels of internal cache. In at least one embodiment, cache memory may reside external to processor 602. In at least one embodiment, processor 602 may also include a combination of both internal and external caches. In at least one embodiment, a register file 606 may store different types of data in various registers including, without limitation, integer registers, floating point registers, status registers, and instruction pointer register.

In at least one embodiment, execution unit 607, including, without limitation, logic to perform integer and floating point operations, also resides in processor 602. Processor 602 may also include a microcode ("ucode") read only memory ("ROM") that stores microcode for certain macro instructions. In at least one embodiment, execution unit 602 may include logic to handle a packed instruction set 609. In at least one embodiment, by including packed instruction set 609 in an instruction set of a general-purpose processor 602, along with associated circuitry to execute instructions, operations used by many multimedia applications may be performed using packed data in a general-purpose processor 602. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 600 may include, without limitation, a memory 620. In at least one embodiment, memory 620 may be implemented as a DRAM device, an SRAM device, flash memory device, or other memory device. Memory 620 may store instruction(s) 619 and/or data 621 represented by data signals that may be executed by processor 602.

In at least one embodiment, a system logic chip may be coupled to processor bus 610 and memory 620. In at least one embodiment, the system logic chip may include, without limitation, a memory controller hub ("MCH") 616, and processor 602 may communicate with MCH 616 via processor bus 610. In at least one embodiment, MCH 616 may provide a high bandwidth memory path 618 to memory 620 for instruction and data storage and for storage of graphics commands, data and textures. In at least one embodiment, MCH 616 may direct data signals between processor 602, memory 620, and other components in computer system 700 and to bridge data signals between processor bus 610, memory 620, and a system I/O 622. In at least one embodiment, system logic chip may provide a graphics port for coupling to a graphics controller. In at least one embodiment, MCH 616 may be coupled to memory 620 through high bandwidth memory path 618 and graphics/video card 612 may be coupled to MCH 616 through an Accelerated Graphics Port ("AGP") interconnect 614.

In at least one embodiment, computer system 600 may use system I/O 622 that is a proprietary hub interface bus to couple MCH 616 to I/O controller hub ("ICH") 630. In at least one embodiment, ICH 630 may provide direct connections to some I/O devices via a local I/O bus. In at least one embodiment, local I/O bus may include, without limitation, a high-speed I/O bus for connecting peripherals to memory 620, a chipset, and processor 602. Examples may include, without limitation, an audio controller 629, a firmware hub ("flash BIOS") 628, a transceiver 626, a data storage 624, a legacy I/O controller 623 containing a user input interface 625 and a keyboard interface, a serial expansion port 627, such as a USB, and a network controller 634. Data storage 624 may comprise a hard disk drive, a floppy disk drive, a CD-ROM device, a flash memory device, or other mass storage device. In an embodiment, the transceiver 626 includes a constrained FFE 608.

In at least one embodiment, FIG. 6 illustrates a system, which includes interconnected hardware devices or "chips" in the transceiver 626—e.g., the transceiver 626 includes a chip-to-chip interconnect including the first device 110 and second device 112 as described with reference to FIG. 1). In at least one embodiment, FIG. 6 may illustrate an exemplary SoC. In at least one embodiment, devices illustrated in FIG. 6 may be interconnected with proprietary interconnects, standardized interconnects (e.g., PCIe), or some combination thereof. In at least one embodiment, one or more components of system 600 are interconnected using compute express link ("CXL") interconnects. In an embodiment, the transceiver 626 can include processing circuitry 132 as described with reference to FIG. 1. In such embodiments, the processing circuitry 132 can facilitate a method to implement low-loss variable optical delay lines. For example, the processing circuitry 132 can implement low-loss variable optical delay lines, as described with reference to FIGS. 2-5.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:
    an optical receiver comprising an optical ring resonator comprising a ring waveguide tuned to a resonant wavelength, and at least one electrical component operatively coupled to the optical ring resonator; and
    a processing device, operatively coupled to a memory, configured to:
        receive optical delay tuning data comprising built-in self-test (BIST) data;
        determine, from the optical delay tuning data, an amount of optical delay to be implemented by the optical ring resonator; and
        cause, in accordance with the amount of optical delay, an amount of voltage to be applied to the at least one electrical component to modify at least one property of the optical ring resonator, the at least one property comprising an index of refraction of a waveguide material of the ring waveguide.

2. The system of claim 1, wherein the amount of voltage causes the at least one electrical component to, in accordance with the amount of optical delay, perform at least one of: generate a number of charge carriers, or change a local temperature of the optical ring resonator.

3. The system of claim 1, wherein the at least one electrical component comprises a resistor.

4. The system of claim 1, wherein the optical ring resonator is comprised in one of: a first optical delay component for receiving polarized light having a first electromagnetic mode, or a second optical delay component for receiving polarized light having a second electromagnetic mode different from the first electromagnetic mode.

5. The system of claim 1, wherein the at least one electrical component comprises a transistor.

6. The system of claim 1, wherein the at least one electrical component comprises a diode.

7. A method, comprising:
    receiving, by a processing device, optical delay tuning data comprising built-in self-test (BIST) data associated with an optical receiver comprising an optical ring resonator comprising a ring waveguide tuned to a resonant wavelength;
    determining, by the processing device from the optical delay tuning data, an amount of optical delay to be implemented by the optical ring resonator; and
    causing, by the processing device in accordance with the amount of optical delay, an amount of voltage to be applied to at least one electrical component operatively coupled to the optical ring resonator to modify at least one property of the optical ring resonator, the at least one property comprising an index of refraction of a waveguide material of the ring waveguide.

8. The method of claim 7, wherein the amount of voltage causes the at least one electrical component to, in accordance with the amount of optical delay, perform at least one of: generate a number of charge carriers, or change a local temperature of the optical ring resonator.

9. The method of claim 7, wherein the at least one electrical component comprises a resistor.

10. The method of claim 7, wherein the optical ring resonator is comprised in one of: a first optical delay component for receiving polarized light having a first electromagnetic mode, or a second optical delay component for receiving polarized light having a second electromagnetic mode different from the first electromagnetic mode.

11. The method of claim 7, wherein the at least one electrical component comprises a transistor.

12. The method of claim 7, wherein the at least one electrical component comprises a diode.

13. A transceiver system comprising:
    an optical transmitter:
    an optical receiver operatively coupled to the optical transmitter, the optical receiver comprising an optical ring resonator comprising a ring waveguide tuned to a resonant wavelength, and at least one electrical component operatively coupled to the optical ring resonator;
    an optical delay tuning data generator; and
    a processing device, operatively coupled to the optical receiver and the optical delay tuning data generator, configured to:
        receive, from the optical delay tuning data generator, optical delay tuning data comprising built-in self-test (BIST) data;
        determine, from the optical delay tuning data, an amount of optical delay to be implemented by the optical ring resonator; and
        cause, in accordance with the amount of optical delay, an amount of voltage to be applied to the at least one electrical component to modify at least one property of the optical ring resonator, the at least one property comprising an index of refraction of a waveguide material of the ring waveguide.

14. The transceiver system of claim 13, wherein the amount of voltage causes the at least one electrical component to, in accordance with the amount of optical delay, perform at least one of: generate a number of charge carriers, or change a local temperature of the optical ring resonator.

15. The transceiver system of claim 13, wherein the at least one electrical component comprises a resistor.

16. The transceiver system of claim 13, wherein the optical ring resonator is comprised in one of: a first optical delay component for receiving polarized light having a first electromagnetic mode, or a second optical delay component for receiving polarized light having a second electromagnetic mode different from the first electromagnetic mode.

17. The transceiver system of claim 13, wherein the at least one electrical component comprises a transistor.

18. The transceiver system of claim 13, wherein the at least one electrical component comprises a diode.

\* \* \* \* \*